June 17, 1930.  F. C. KUMMER  1,764,634
SAW GUARD
Filed Aug. 24, 1929   2 Sheets-Sheet 1
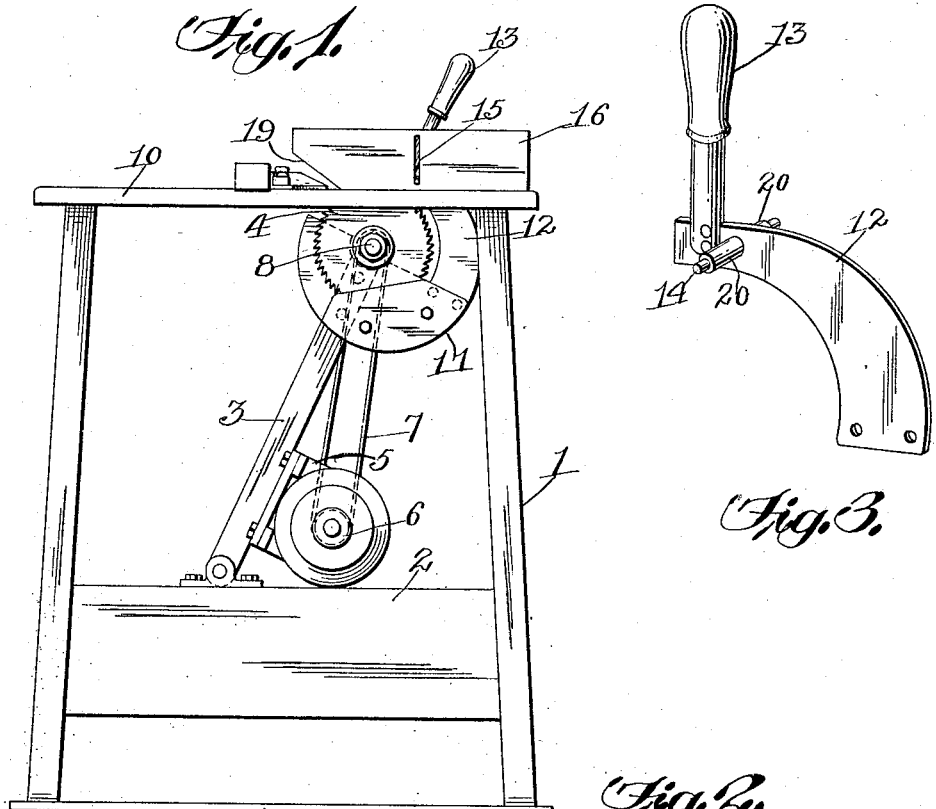
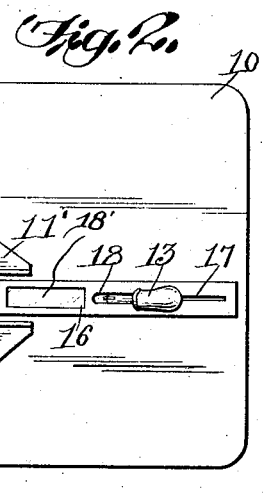
Inventor
Frederick C. Kummer
By
Attorneys June 17, 1930.  F. C. KUMMER  1,764,634
SAW GUARD
Filed Aug. 24, 1929   2 Sheets-Sheet 2
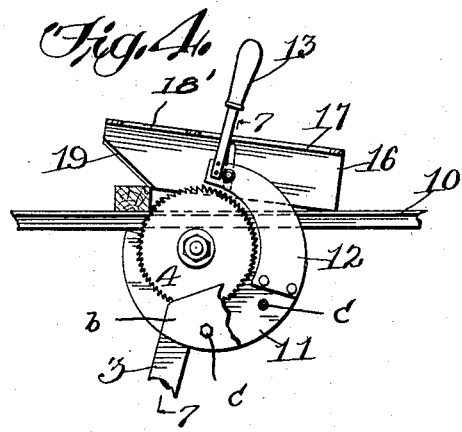
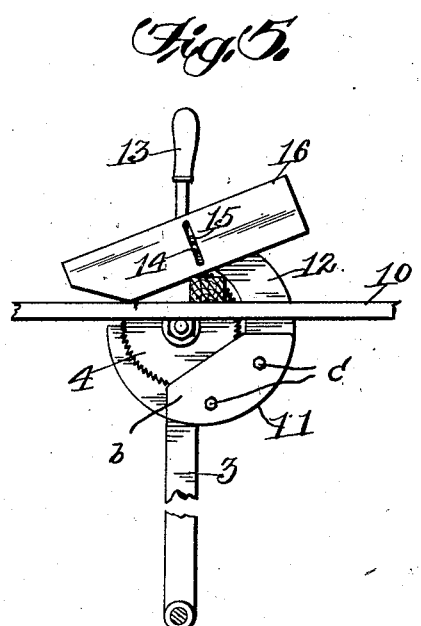
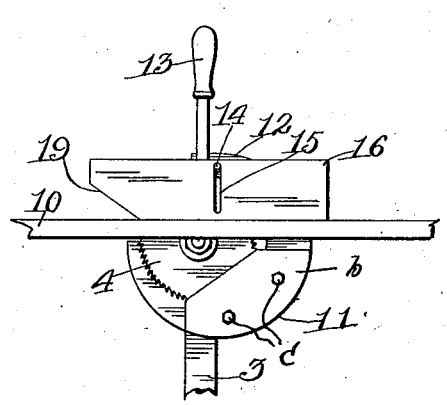
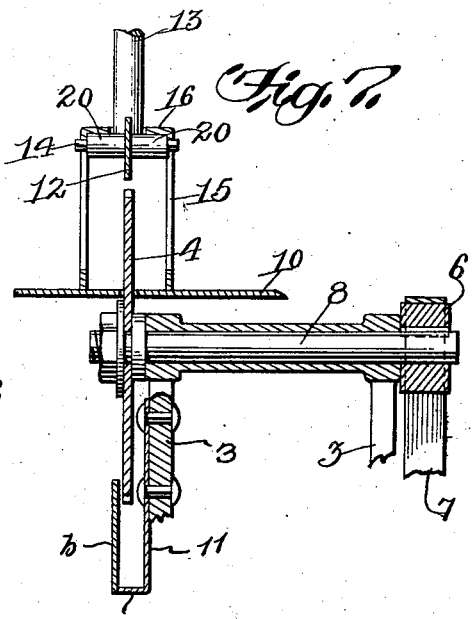
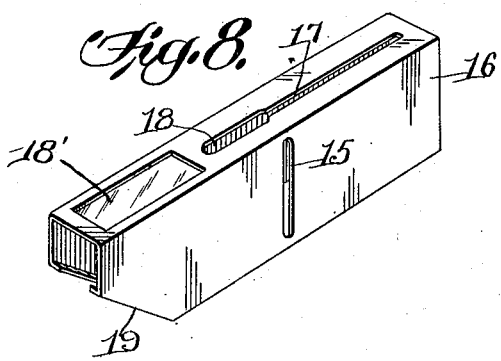
Inventor
Frederick C. Kummer
By Young & Young
Attorneys Patented June 17, 1930

1,764,634

UNITED STATES PATENT OFFICE

FREDERICK C. KUMMER, OF WAUWATOSA, WISCONSIN, ASSIGNOR TO KERNER INCINERATOR COMPANY, OF WAUWATOSA, WISCONSIN

SAW GUARD

Application filed August 24, 1929. Serial No. 388,205.

This invention relates to new and useful improvements in saw guards.

One of the objects of my invention is the provision of a new and improved type of saw guard adapted to be applied to saws of the movable arbor type wherein the arbor and the saw are moved into cutting position by the operator, and the guard is of such nature as to positively protect the operator at all times from the saw blade, but at the same time permit the passage of the work beneath the guard while being operated upon by the saw.

Another object of the invention is the provision of a saw guard adapted to be operatively connected to the movable arbor of a saw and is preferably of what is known as the floating type of guard wherein the work can be readily passed beneath the guard which will position itself relative the work so that the guard will at all times protect the operator from the moving saw teeth.

A further object of the invention is the provision of a saw guard of the above type which is extremely simple in construction, and can be manufactured at a very low cost and can be quickly and readily applied to movable arbor saws at a very low cost.

With the above and other objects in view, the invention consists in the novel features of construction, the combination and arrangement of parts hereinafter more fully set forth, pointed out in the claims and shown in the accompanying drawings wherein:

Figure 1 is a side elevation of a portable movable arbor saw, illustrating the application of my improved guard;

Figure 2 is a detail plan view, illustrating the work in position to be operated upon;

Figure 3 is a detail perspective view of the arm which forms the connection between the arbor and the movable guard;

Figure 4 is a detail elevation, with parts broken away and shown in cross section, illustrating the work about to be engaged by the saw and the relative position which the guard assumes at this point;

Figure 5 is a side elevation similar to Figure 4, illustrating the relative position of the guard after the work has been nearly completed; and, Figure 6 is a view similar to Figure 5, showing the saw guard in position over the saw blade;

Figure 7 is a detail section on the line 7—7 of Figure 4;

Figure 8 is a perspective view of the box-like guard member.

In the accompanying drawings, I have shown for the purpose of illustration, a supporting frame generally indicated at 1. This frame carries a supporting base 2 upon which is pivotally mounted a pair of movable arms 3 for the ordinary cross cut saw 4. The arms 3 have a bracket 5 attached to one side thereof for supporting pulley 6, which is connected by means of the belt 7 to the arbor 8 of the saw 4.

The saw 4 is mounted in suitable bearings at the upper end of arms 3 and moves through a slot 9 in the table portion 10 on the frame 1. On the table top 10, I have illustrated the usual guides 11 which are used for correctly positioning the work before being operated upon by the saw. Connected to one of the arms 3 is a guard plate 11 which forms an attaching plate for the lower end of a substantially arcuate arm 12. This arm 12 is bolted or otherwise secured to one end of the plate 11 and is curved for the greater portion of its length to correspond to the perimeter of the saw 4, and is so connected to the plate 11 that it lies in the same plane with the saw. The plate 11 which forms the guard plate is provided with a laterally projecting flange a and spaced from this plate 11 is a second plate b, the lower edge of which rests against the outer edge of flange a and is secured in position by means of bolts c, thus forming a complete guard for the lower portion of the saw, as illustrated in Figures 6 and 7 of the drawings.

Connected to the upper end of the arm 12 is a hand lever 13 and extending through the arm 12 adjacent the hand lever 13 is a transverse pin 14, the ends of which are slidably mounted in the transverse slots 15 formed within the side walls of a substantially rectangular box-like guard member 16.

The guard member 16 may be formed of sheet metal or other suitable material and is slotted longitudinally at one side to permit the passage of the saw therethrough, while the opposite side is also slotted at 17 to permit movement of arm 12 with respect to the guard, as shown in Figure 4, while one end of the slot 17 is enlarged at 18 to permit movement therein of the hand lever 13.

The guard member 16 is formed with an inclined face 19 at one end for engaging the work, as shown in Figure 4, so that the said guard member will readily ride over the work, while the saw blade 4 is being passed through the work, this being clearly illustrated in Figure 5, and due to the fact that the guard member 16 is loosely mounted upon the rotatable surface 20 on the ends of pin 14, the guard member may readily assume various positions with respect to the work as the saw passes through the work. The pin 14 is carried by arm 12 adjacent the outer end thereof and in addition to the rotatable sleeves 20, the extremities of the pin are reduced and fitted within the transverse slots 15, as shown in Figure 7.

Referring particularly to the perspective view in Figure 8 of the drawings, the guard member 16 is provided upon its upper face with a glass window 18'. The function of this window is for observing the cut and work through the box when the saw is utilized as a rip saw, in which event the rip saw is locked in its highest position, as shown in Figure 6 of the drawings.

It will be apparent from the foregoing that I have provided a very simple and inexpensive saw guard which can be readily attached to a movable saw arbor and so arranged that the guard will at all times be positioned over the saw blade so as to positively protect the operator regardless of the position of the work with respect to the saw and the guard will be moved simultaneously with the movement of the saw blade so as to carry the same entirely over the work which is being operated upon.

While I have shown and described the preferred embodiment of my invention, it will be apparent that slight changes may be made in the construction when putting the invention into practice without departing from the spirit of the same or the scope of the appended claims.

I claim:

1. In a device of the class described including a movable arm, a rotatable saw blade carried thereby, an arcuate arm carried by the movable arm and aligned with the saw blade, a box-like guard member having connection with the arcuate arm to permit swinging and rotating movement, and a hand lever carried by the arcuate arm for imparting movement thereto, and simultaneously imparting movement to the movable arm.

2. A device of the class described including a pivotally mounted arm, a rotatable saw blade carried thereby, an arcuate aligned arm with the saw blade and connected to the movable arm, a hand lever attached to the arcuate arm for imparting movement thereto and simultaneously imparting movement to the movable arm, and a movable saw guard having connection with the arcuate arm for assuming various relative positions with respect to the arm and arranged above the saw blade.

3. A device of the class described including a movable arm, a movable saw member carried thereby, an arcuate arm connected to the movable arm and aligned with the saw, a hand lever carried by the second arm and a movable guard member positioned over the saw and having connection with the arcuate arm whereby the movement of the arcuate arm will cause the guard member to assume various relative positions with respect to the saw.

In testimony that I claim the foregoing I have hereunto set my hand at Wauwatosa, in the county of Milwaukee and State of Wisconsin.

FREDERICK C. KUMMER.